United States Patent
McCauley et al.

(10) Patent No.: US 12,204,459 B2
(45) Date of Patent: Jan. 21, 2025

(54) DATA CACHE REGION PREFETCHER

(71) Applicant: Advanced Micro Devices, Inc., Santa Clara, CA (US)

(72) Inventors: Donald W. McCauley, Austin, TX (US); William E. Jones, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/752,244

(22) Filed: May 24, 2022

(65) Prior Publication Data
US 2022/0283955 A1    Sep. 8, 2022

Related U.S. Application Data

(63) Continuation of application No. 15/292,777, filed on Oct. 13, 2016, now abandoned.
(Continued)

(51) Int. Cl.
*G06F 12/08* (2016.01)
*G06F 12/0862* (2016.01)
(Continued)

(52) U.S. Cl.
CPC .......... *G06F 12/12* (2013.01); *G06F 12/0862* (2013.01); *G06F 12/0891* (2013.01);
(Continued)

(58) Field of Classification Search
CPC .. G06F 12/12; G06F 12/0862; G06F 12/0891; G06F 12/0848; G06F 12/0886;
(Continued)

(56) References Cited

U.S. PATENT DOCUMENTS 6,961,820 B2    11/2005    Day et al.
8,356,142 B1 *   1/2013    Danilak .............. G06F 12/0862
                                                      711/137
(Continued)

FOREIGN PATENT DOCUMENTS

CN        1604055 A     4/2005
CN        1849591 A    10/2006
(Continued)

OTHER PUBLICATIONS

"Program Counter (PC)", Technopdeia; retrieved from "https://www.technopedia.com/definition/13114/program-counter-pc"; pp. 1-2; Jun. 17, 2021.

*Primary Examiner* — Eric T Loonan
(74) *Attorney, Agent, or Firm* — Volpe Koenig

(57) ABSTRACT

A method, system, and processing system for pre-fetching data is disclosed. The method, system, and processing system includes data cache region prefetch circuitry for detecting a first access by a first instruction at a first instruction address to a first memory portion, detecting a first non-sequential access pattern to a set of addresses in the first memory portion, and in response to a miss by a second instruction at the first instruction address, and in response to the non-sequential access pattern occurring, pre-fetching data according to the first non-sequential access pattern.

18 Claims, 8 Drawing Sheets

Related U.S. Application Data

(60) Provisional application No. 62/377,314, filed on Aug. 19, 2016.

(51) Int. Cl.
*G06F 12/0891* (2016.01)
*G06F 12/12* (2016.01)
G06F 12/0846 (2016.01)
G06F 12/0886 (2016.01)

(52) U.S. Cl.
CPC ...... *G06F 12/0848* (2013.01); *G06F 12/0886* (2013.01); *G06F 2212/1021* (2013.01); *G06F 2212/6024* (2013.01); *G06F 2212/6026* (2013.01)

(58) Field of Classification Search
CPC ... G06F 2212/1021; G06F 2212/60244; G06F 2212/6026; G06F 2212/6024
See application file for complete search history.

(56) References Cited

U.S. PATENT DOCUMENTS

| | | | |
|---|---|---|---|
| 9,116,814 B1 | 8/2015 | McCauley et al. | |
| 2004/0268051 A1 | 12/2004 | Berg et al. | |
| 2005/0071571 A1 | 3/2005 | Luick | |
| 2007/0055824 A1* | 3/2007 | Diefendorff | G06F 12/1027 711/137 |
| 2007/0288697 A1 | 12/2007 | Keltcher | |
| 2010/0153650 A1 | 6/2010 | Guthrie et al. | |
| 2010/0153653 A1 | 6/2010 | El-Mahdy et al. | |
| 2010/0262750 A1 | 10/2010 | Deshpande et al. | |
| 2011/0066808 A1 | 3/2011 | Flynn et al. | |
| 2011/0307664 A1 | 12/2011 | Paver et al. | |
| 2013/0145102 A1 | 6/2013 | Wang et al. | |
| 2013/0238861 A1* | 9/2013 | Manne | G06F 12/0897 711/137 |
| 2013/0346703 A1 | 12/2013 | McCauley et al. | |
| 2014/0006717 A1* | 1/2014 | Steely, Jr. | G06F 12/0862 711/E12.022 |
| 2014/0136792 A1* | 5/2014 | Frachtenberg | G06F 12/0862 711/135 |
| 2014/0229681 A1* | 8/2014 | McNutt | G06F 12/0862 711/137 |
| 2015/0026413 A1 | 1/2015 | Meier et al. | |
| 2015/0339132 A1* | 11/2015 | Chen | G06F 15/177 713/100 |
| 2016/0019065 A1 | 1/2016 | Hayenga et al. | |
| 2016/0179544 A1* | 6/2016 | Heinecke | G06F 9/383 712/207 |
| 2017/0083443 A1* | 3/2017 | Wang | G06F 12/0862 |

FOREIGN PATENT DOCUMENTS

| | | |
|---|---|---|
| CN | 103218309 A | 7/2013 |
| JP | 2002-032264 A | 1/2002 |

* cited by examiner

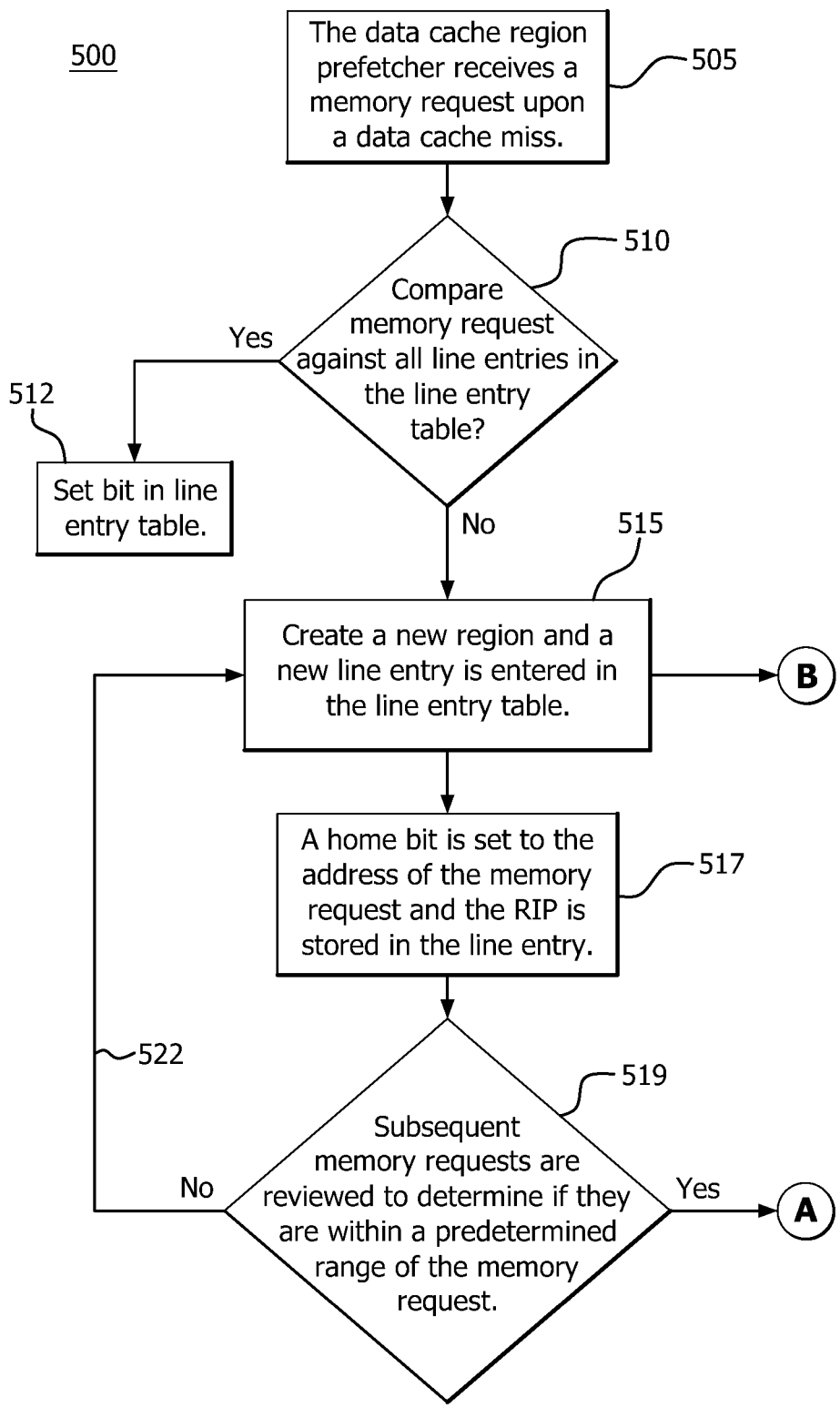
FIG. 5A1

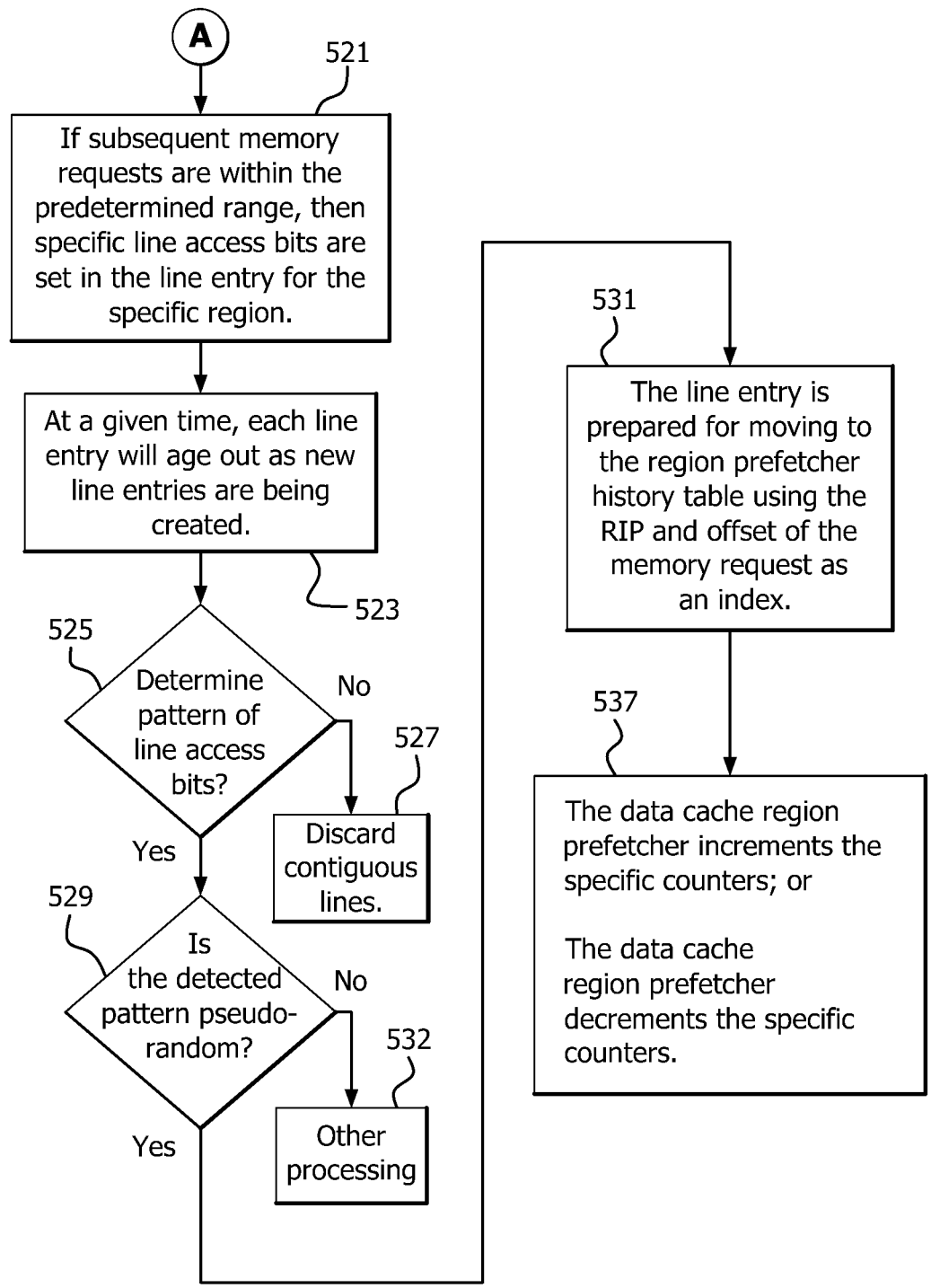
FIG. 5A2

DATA CACHE REGION PREFETCHER

CROSS REFERENCE TO RELATED APPLICATIONS

This application is a continuation of U.S. patent application Ser. No. 15/292,777, filed Oct. 13, 2016, which claims the benefit of U.S. Provisional Application No. 62/377,314, having a filing date of Aug. 19, 2016, which are incorporated by reference as if fully set forth herein.

BACKGROUND

Many processing devices utilize caches to reduce the average time required to access information stored in a memory. A cache is a smaller and faster memory that stores copies of instructions or data that are expected to be used relatively frequently. For example, central processing units (CPUs), one type of processor that uses caches, are generally associated with a cache or a hierarchy of cache memory elements. Other processors, such as graphics processing units, also implement cache systems. Instructions or data that are expected to be used by the CPU are moved from (relatively large and slow) main memory into the cache. When the CPU needs to read or write a location in the main memory, the CPU first checks to see whether a copy of the desired memory location is included in the cache memory. If this location is included in the cache (a cache hit), then the CPU can perform the read or write operation on the copy in the cache memory location. If this location is not included in the cache (a cache miss), then the CPU needs to access the information stored in the main memory and, in some cases, the information can be copied from the main memory and added to the cache. Proper configuration and operation of the cache can reduce the average latency of memory accesses to a value below the main memory latency and close to the cache access latency.

A prefetcher is used to populate the lines in the cache before the information in these lines has been requested. The prefetcher monitors memory requests associated with applications running in the processor and uses the monitored requests to determine or predict that the processor is likely to access a particular sequence of memory addresses in a memory region, where the latter is generally referred to as a stream. Prefetchers keep track of multiple streams and independently prefetch data for the different streams.

BRIEF DESCRIPTION OF THE DRAWINGS

A more detailed understanding may be had from the following description, given by way of example in conjunction with the accompanying drawings wherein:

FIGS. 5A1, 5A2 and 5B are example flow diagrams of the methods for use with a data cache region prefetcher in accordance with certain implementations.

DETAILED DESCRIPTION

Described herein is a data cache region prefetcher. The data cache region prefetcher recognizes cache access patterns generated by a program (e.g., in response to load or store instructions), and issues prefetch requests to copy data from main memory to the data cache in anticipation of possible future requests for this data. In particular, the data cache region prefetcher attempts to detect patterns where, after a given instruction accesses a data line, other data lines that are within a predetermined range of the initial accessed data line are subsequently accessed. The predetermined range of data lines including the initial accessed data line is termed a region and each region is tagged with an instruction pointer register (RIP). The patterns associated with each region are then used to prefetch data lines for subsequent accesses by the same RIP.

Figure 1:
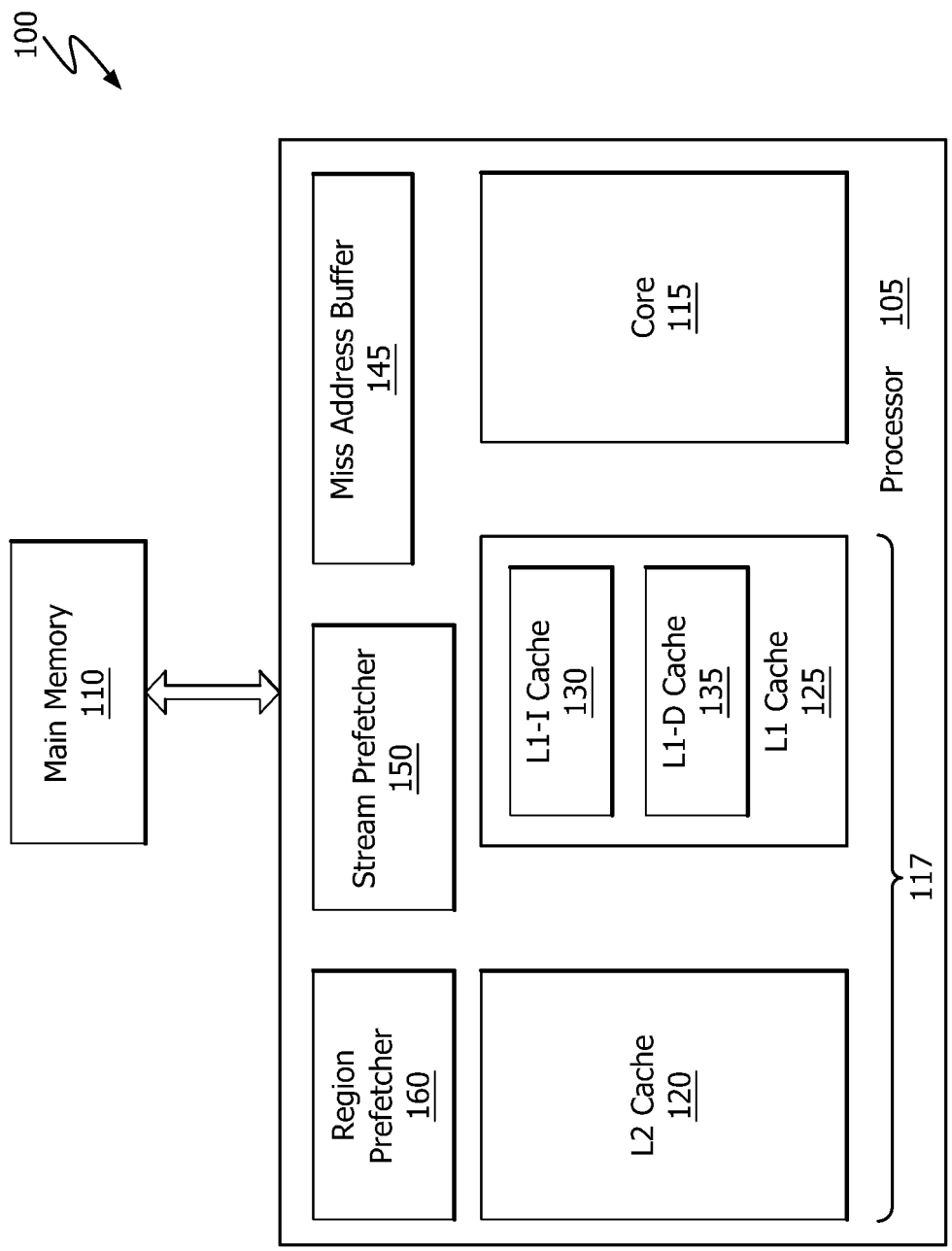
FIG. 1 is a high level block diagram of a system that uses a data cache region prefetcher in accordance with certain implementations.

FIG. 1 is a high level block diagram of a processing system 100 that uses a data cache region prefetcher 160 in accordance with certain implementations. The processing system 100 includes a processor 105 that is configured to access instructions or data that are stored in a main memory 110. The processor 105 includes at least one core 115 that is used to execute the instructions or manipulate the data and a hierarchical (or multilevel) cache system 117 that speeds access to the instructions or data by storing selected instructions or data in the cache system 117. The described processing system 100 is illustrative and other architectures and configurations can be implemented without departing from the scope of the disclosure.

The cache system 117 includes a level 2 (L2) cache 120 for storing copies of instructions or data that are stored in the main memory 110. In an implementation, the L2 cache 120 is 16-way associative to the main memory 110 so that each line in the main memory 110 can potentially be copied to and from 16 particular lines (which are conventionally referred to as "ways") in the L2 cache 120. Relative to the main memory 110, the L2 cache 120 is implemented using smaller and faster memory elements. The L2 cache 120 is deployed logically or physically closer to the core 115 (relative to the main memory 110) so that information can be exchanged between the core 115 and the L2 cache 120 more rapidly or with less latency.

The cache system 117 also includes an L1 cache 125 for storing copies of instructions or data that are stored in the main memory 110 or the L2 cache 120. Relative to the L2 cache 120, the L1 cache 125 is implemented using smaller and faster memory elements so that information stored in the lines of the L1 cache 125 can be retrieved quickly by the processor 105. The L1 cache 125 may also be deployed logically or physically closer to the core 115 (relative to the main memory 110 and the L2 cache 120) so that information may be exchanged between the core 115 and the L1 cache 125 more rapidly or with less latency (relative to communication with the main memory 110 and the L2 cache 120). In an implementation, different multilevel caches including elements such as L0 caches, L1 caches, L2 caches, L3 caches, and the like are used. In some implementations, higher-level caches are inclusive of one or more lower-level caches so that lines in the lower-level caches are also stored in the inclusive higher-level caches.

The L1 cache 125 is separated into level 1 (L1) caches for storing instructions and data, which are referred to as the L1-I cache 130 and the L1-D cache 135. Separating or partitioning the L1 cache 125 into the L1-I cache 130 for storing only instructions and the L1-D cache 135 for storing only data allows these caches to be deployed closer to the entities that are likely to request instructions or data, respectively. Consequently, this arrangement reduces contention, wire delays, and generally decreases latency associated with instructions and data. In one implementation, a replacement policy dictates that the lines in the L1-I cache 130 are replaced with instructions from the L2 cache 120 and the lines in the L1-D cache 135 are replaced with data from the L2 cache 120.

The processor 105 also includes a stream prefetcher 150 and the data cache region prefetcher 160 that are used to populate data lines in one or more of the caches 125, 130, 135. Although the stream prefetcher 150 and data cache region prefetcher 160 are depicted as separate elements within the processor 105, the stream prefetcher 150 and data cache region prefetcher 160 can be implemented as a part of other elements. In an implementation, the stream prefetcher 150 and data cache region prefetcher 160 are hardware prefetchers. In an implementation, the stream prefetcher 150 and data cache region prefetcher 160 monitor memory requests associated with applications running in the core 115. For example, the stream prefetcher 150 and data cache region prefetcher 160 monitor memory requests (e.g., data line accesses) that result in cache hits or misses, which are recorded in a miss address buffer (MAB) 145. Although the stream prefetcher 150 and data cache region prefetcher 160 both determine or predict that the core 115 is likely to access a particular sequence of memory addresses in the main memory 110 (nominally called a stream), each prefetcher handles accesses differently.

The stream prefetcher 150 detects two or more contiguous and sequential memory accesses by the core 115. A direction of a sequence is determined based on a temporal sequence of the sequential memory accesses and the core 115 uses this direction to predict future memory accesses by extrapolating based upon the current or previous sequential memory accesses. The stream prefetcher 150 then fetches the information in the predicted locations from the main memory 110 and stores this information in an appropriate cache so that the information is available before it is requested by the core 115.

In general, the data cache region prefetcher 160 creates a region when a data cache miss occurs. Each region includes a predetermined range of data lines proximate to each data cache miss and is tagged with an associated RIP. The data cache region prefetcher 160 then compares subsequent memory requests against the predetermined range of data lines for each of the existing regions. For each match, the data cache region prefetcher 160 sets an access bit and attempts to identify a pseudo-random access pattern based on the set access bits. The data cache region prefetcher 160 later increments or decrements appropriate counters to track how often the pseudo-random access pattern occurs. If the pseudo-random access pattern occurs frequently (e.g., based on preset thresholds), then the next time a memory request is processed with the same RIP, the data cache region prefetcher 160 prefetches the data lines in accordance with the pseudo-random access pattern for that RIP.

In an implementation, there is feedback between the stream prefetcher 150 and data cache region prefetcher 160. This feedback is used to throttle the stream prefetcher 150. For example, the enabling of a flag allows the data cache region prefetcher 160 to block the stream prefetcher 150 from acting on newly created streams with pending data cache region prefetch requests as described herein below.

Figure 2:
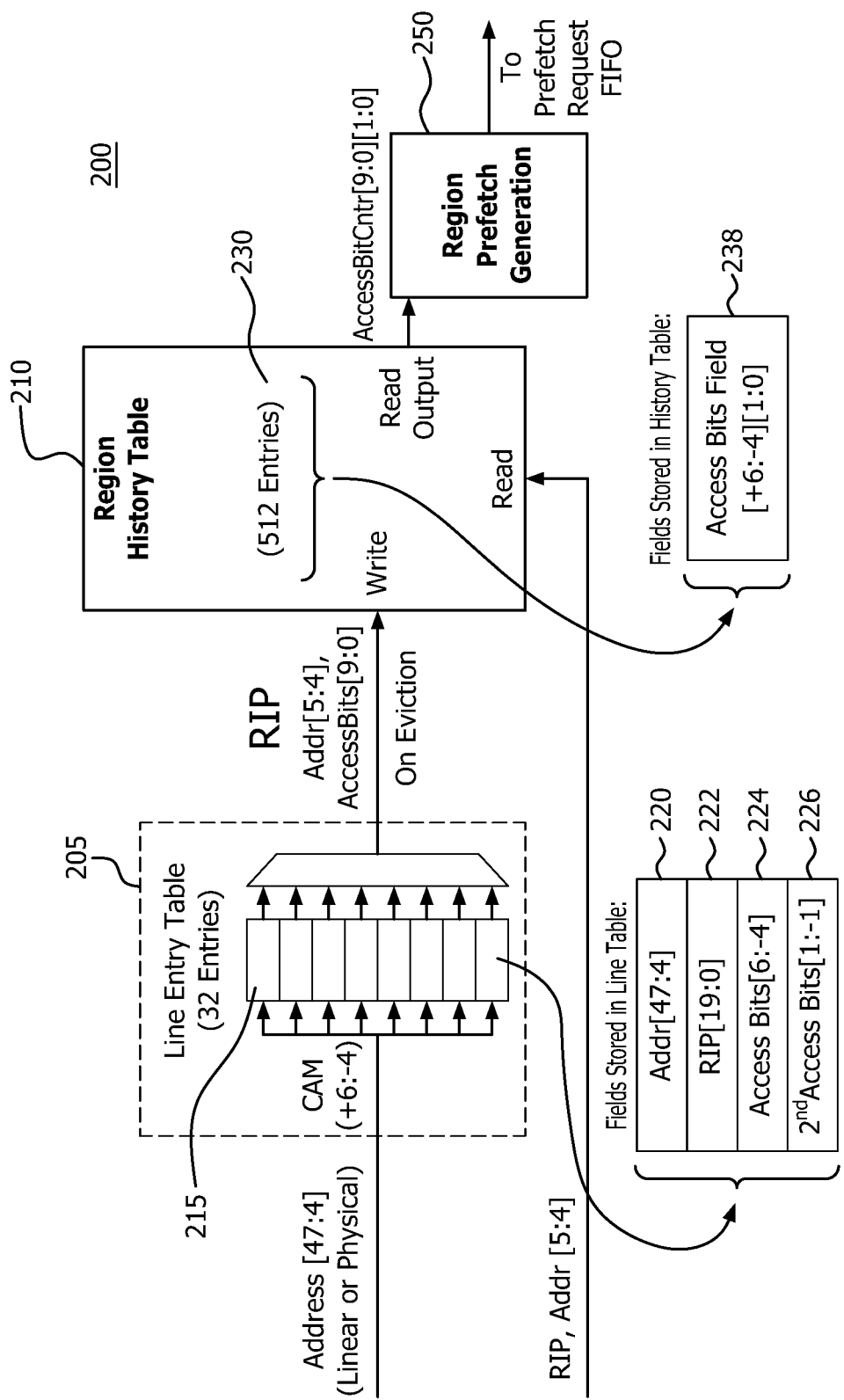
FIG. 2 is a high level block diagram of a data cache region prefetcher in accordance with certain implementations.

FIG. 2 is a high level block diagram of a data cache region prefetcher 200 in accordance with certain implementations. The data cache region prefetcher 200 includes a line entry table 205 (which is a training structure) coupled to a region history table 210 (which is a backing structure populated by the training structure). The number of table entries and the size of the fields described herein are illustrative only and other values can be used without departing from the scope of the disclosure.

The line entry table 205 includes a predetermined number of line entries 215. In an implementation, the line entry table 205 includes 32 entries. Each line entry 215 includes a RIP field 220, an address field 222 for the data line, an access bits field 224 and a second line access bits field 226. In an implementation, the RIP field 220 is a 20 bit field, the address field 222 is a 44 bit field, the access bits field 224 is an 11 bit field and the second line access bits field 226 is a 3 bit field. In an implementation, the line entry table 205 is implemented using a content addressable memory (CAM).

The region history table 210 includes a predetermined number of region history entries 230 that are indexed in one implementation using a 9-bit hash of RIP[19:0] and Addr [5:4] (where the latter is also referred to as an offset). In an implementation, the region history table 210 includes 512 entries. Each region history table entry 230 has an access bits/counter field 238, where each bit (excluding bit 0) in the access bits/counter field 238 has a 2 bit counter. In an implementation, access bits/counter field 238 is a 22 bit two-dimensional array or data structure with 11 entries and a 2 bit counter per entry. In an implementation, the 2 bit counters are up/down counters.

Memory requests or data line accesses from a processor are inserted into the line entry table 205 on data cache misses to create regions. The RIP field 220 and address field 222 of each region are populated with the RIP and address associated with each missed memory request. Each region is defined by a predetermined range of data lines proximate the memory request that missed the data cache. The access bits field 224 includes a bit for each data line in the predetermined range of data lines. A predetermined position or bit in the access bits field 224 is designated as a home position or home bit. The home bit being the memory request that missed the data cache and created the specific region. In the illustrative implementation, the predetermined range is 10 data lines and the range is +6 data lines and −4 data lines from the home bit, where the home bit is bit 0 or position 0. Subsequent memory requests are compared (using for example a CAM) to determine if the subsequent memory requests are within the predetermined range of data lines. A corresponding bit is set in the access bits field 224 of the region for each subsequent memory request that is within the predetermined range.

The setting of the access bits in the access bits field 224 establishes pseudo-random patterns that are used by the region history table 210 to potentially prefetch data lines. In particular, when a memory request in the line entry table 205 ages out and has a valid pattern established by the setting of some bits in the access bits field 224, the memory request is evicted to the region history table 210 and the fields as described above are populated. The second line access bits field 226 is used to determine if the pseudo-random pattern indicates two or more contiguous and sequential memory accesses (i.e., a non-valid pattern), in which case the region is not moved to the region history table 210 and is handled by the stream prefetcher 150 as shown in FIG. 1.

The region history table 210 tracks the number of times a memory request with a given RIP and offset was followed by requests to surrounding data lines in accordance with the established pattern. The tracking information is kept using the 2 bit counters in the access bits/counter field 238. In an implementation, when updating the region history table entry 230, each individual 2 bit up/down counter in the access bits/counter field 238 is either incremented (if the corresponding access bit in the line entry is 1) or decremented (if the corresponding access bit in the line entry is 0). When decrementing, these 2 bit up/down counters saturate at 0. When incrementing, these 2 bit up/down counters saturate at 3. When a subsequent data cache miss creates a new line entry, the associated RIP and offset are used to select one of the entries in the region history table 210, then the 2 bit counters in the access bits/counter field 238 are used to determine if a prefetch is appropriate by comparing against a threshold (e.g., 2). If a prefetch is warranted, the appropriate or relevant information is sent to a region prefetch generation unit 250 to generate a prefetch request, which in turn sends the prefetch request to a prefetch request first in, first out (FIFO) buffer (not shown).

Figure 3:
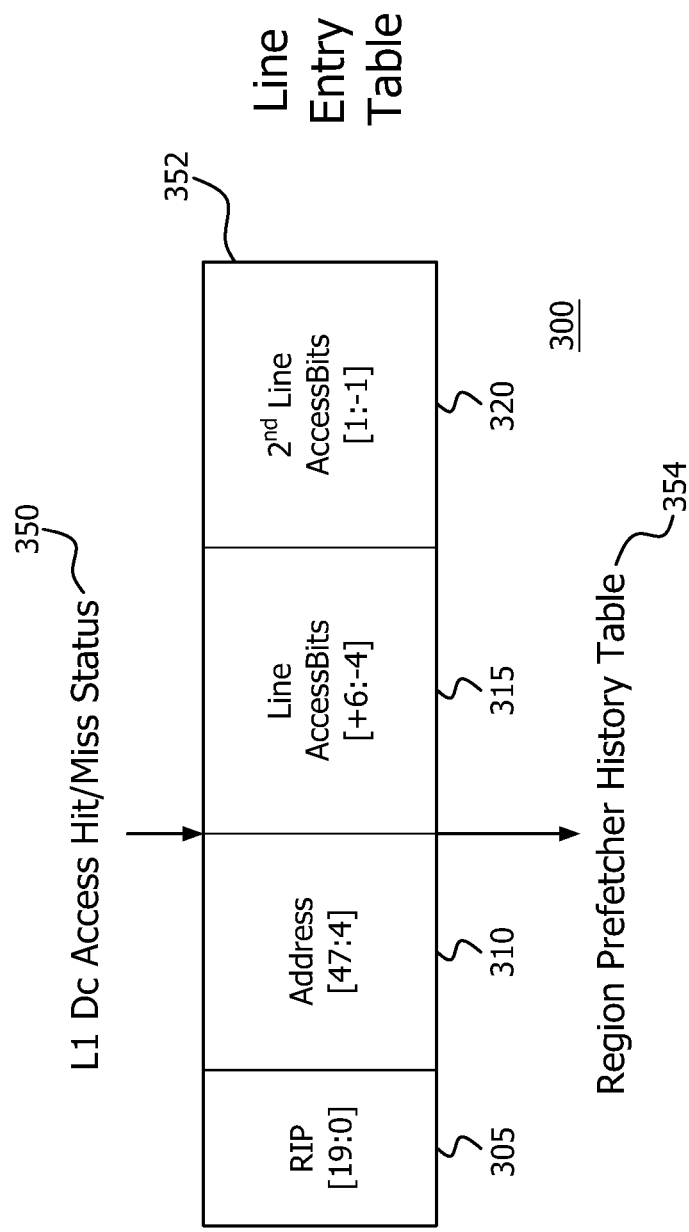
FIG. 3 is a block diagram of and a flow diagram for a line entry in a line entry table structure for a data cache region prefetcher in accordance with certain implementations.

FIG. 3 is a block diagram of and a flow diagram for a line entry 300 in a line entry table structure for a data cache region prefetcher in accordance with certain implementations. Each line entry 300 includes a RIP field 305, an address field 310 for the data cache miss, an access bits field 315 and a second ($2^{nd}$) line access bits field 320. In an implementation, the RIP field 305 is a 20 bit field, the address field 310 is a 44 bit field, the access bits field 315 is an 11 bit field and the second line access bits field 320 is a 3 bit field. In an implementation, the access bits field 315 represents the range of the data cache region prefetcher from +6 to −4 data lines, where bit 0 is the data line or address associated with the data cache miss (which is designated "home" as stated above).

The second line access bits field 320 is used to determine if there are two or more contiguous and sequential memory accesses relative to home. That is, the second line access bits field 320 is used to differentiate between sequential (stride=+1 or −1 cache lines) streams and other, non-sequential access patterns. Sequential streams train on the second access to the stream/region if that access is to the next sequential (+/− 1) cache line. The stream prefetcher handles sequential streams, which are excluded from the region history table. In particular, if second line access bits +1 and −1 are set, then the corresponding stream or associated region is not moved to the region history table. If the second access to the region is not to the next sequential (+/− 1) cache line, then the second line access bit 0 is set. The second line access bit 0 indicates that the second access to the region was not to the next sequential (+/− 1) cache line. These line entries, with non-sequential access patterns, are candidates for inclusion in the region history table.

Operationally, a data cache (Dc) miss status is used as an input to the line entry table (step 350). Each data cache miss which does not update an existing region creates a new region that is entered into a new line entry 300 and the appropriate fields are populated as discussed herein (step 352). The old line entry 300 is evicted in accordance with a least-recently-used replacement algorithm. If a valid pattern exists in the access bits field 315 and second line access bits field 320 in the old line entry 300, the old line entry 300 is used to update the region history table (step 354).

Figure 4:
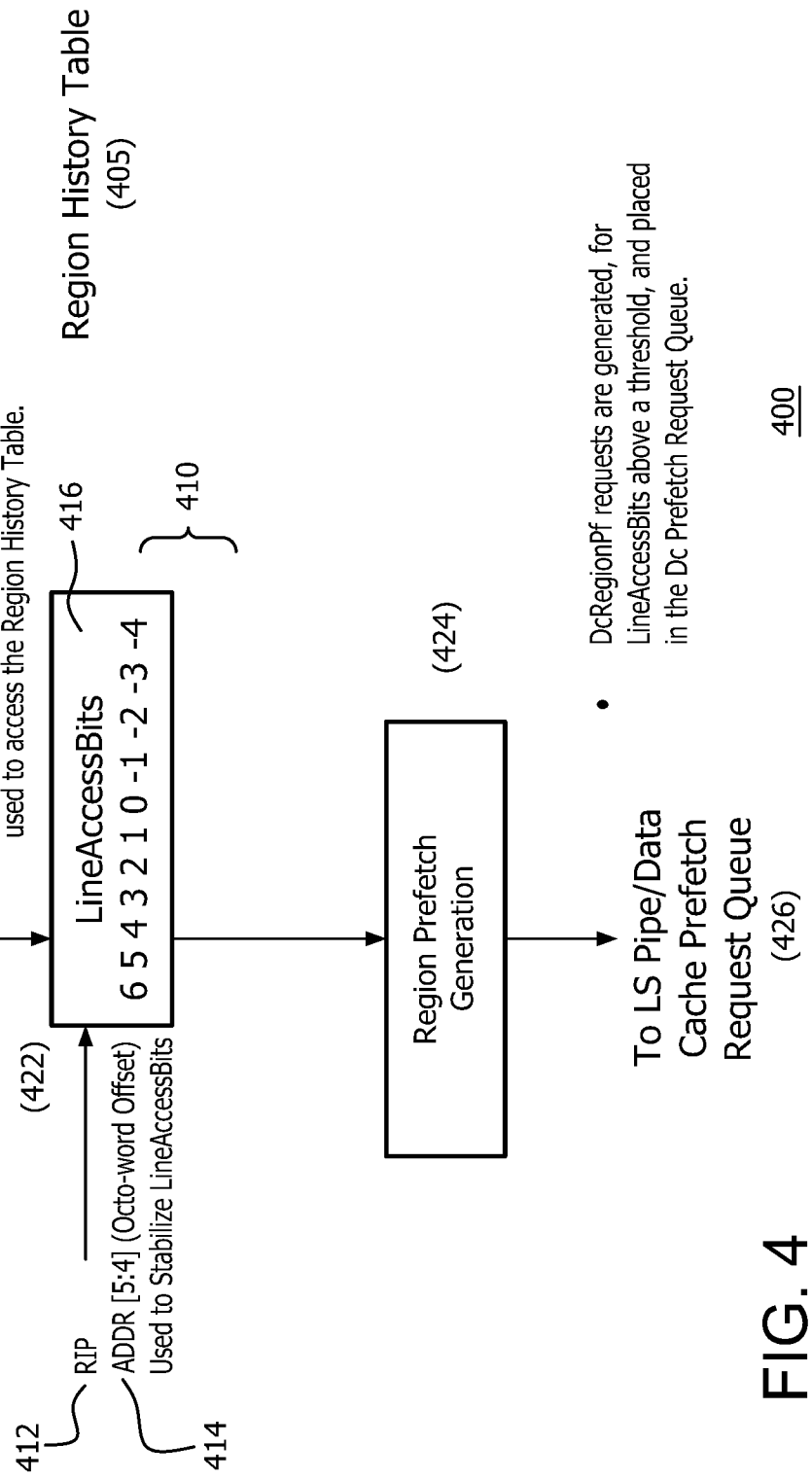
FIG. 4 is a flow diagram for a region history table structure in a data cache region prefetcher in accordance with certain implementations.

FIG. 4 is a flow diagram 400 for a region history table 405 in a data cache region prefetcher in accordance with certain implementations. The region history table 405 includes multiple region history table entries 410 which are RIP and offset-indexed. Each region history table entry 410 includes an access bits/counter field 416 that includes 2 bit counters for each bit in the access bit/counter field 416. In an implementation, the access bits/counter field 416 is a 22 bit two-dimensional array or data structure with 11 entries and a 2 bit counter per entry. An address offset 414 (shown as an octo-word offset with address bits 5 and 4), is used to allow multiple different line access patterns to be stored in the region history table 405 so that multiple different data line access patterns can be prefetched for a given RIP based on where within the 64-byte cache line the initial data line access (i.e., home bit) is located. If the initial data access within a region is near the beginning or the end of a data line, additional data lines or a different pattern of data lines may need to be prefetched. More specifically, the region prefetcher tracks a pseudo-random sequence of load/store memory accesses made by a program to a region of system memory. These load/store memory accesses are typically 4, 8 or 16 bytes, much smaller than a cache line, which is typically 64 bytes. The region prefetcher maps these load/store memory accesses onto a second, coarser pseudo-random pattern of 64 B cache lines surrounding the initial memory access cache miss which created the region. This second, coarser pseudo-random pattern is the line access bits.

Even assuming the pseudo-random sequence of load/store memory accesses is consistent, the same address offsets are used from memory region to memory region, and the mapping of these 4, 8 or 16 byte memory accesses onto 64 B cache lines (the line access bits) varies depending on whether the initial memory access cache miss which created the region was to the beginning, middle or end of a cache line.

Including the address offset 414 (Addr[5:4]) of the initial memory access into the index used to access the region history table allows multiple, different line access patterns to be stored in the region history table for the same RIP based on the alignment of the region within system memory relative to a 64 B cache line boundary.

Operationally, when an old line entry 300 is evicted from the line entry table and if a valid pattern exists in the access bits field 315 and second line access bits field 320 in the old line entry 300, the old line entry 300 is used to update the region history table (step 420). In particular, the given RIP and address offset for the old line entry 300 are used as an index to read out a region history table entry 410 from the region history table 405. The 2 bit counters in the access bits/counter field 416 are used to track the number of times the given RIP and address offset follow the established pattern. Each bit in the access bits field 315 in the old line entry 300 is examined. If a line access bit field 315 is 1, then the data cache region prefetcher increments the corresponding 2 bit counter in the access bits/counter field 416 in the region history line table 410. If a line access bit field 315 is 0, then the data cache region prefetcher decrements the corresponding 2 bit counter in the access bits/counter field 416 in the region history line table 410.

When a subsequent data cache miss creates a new line entry 300, the RIP and address offset associated with the new line entry 300 are used as an index to read out a region history table entry 410 from the region history table 405. The data cache region prefetcher then examines each 2 bit counter in the access bits/counter field 416. If a counter is above a threshold (e.g., 2), the data cache region prefetcher generates a region prefetch request (step 424) for the corresponding cache line offset. These cache line offsets are relative to the home address of the new line entry 300. The generated region prefetch request is placed in the data cache prefetch request queue (step 426).

Figure 5B:
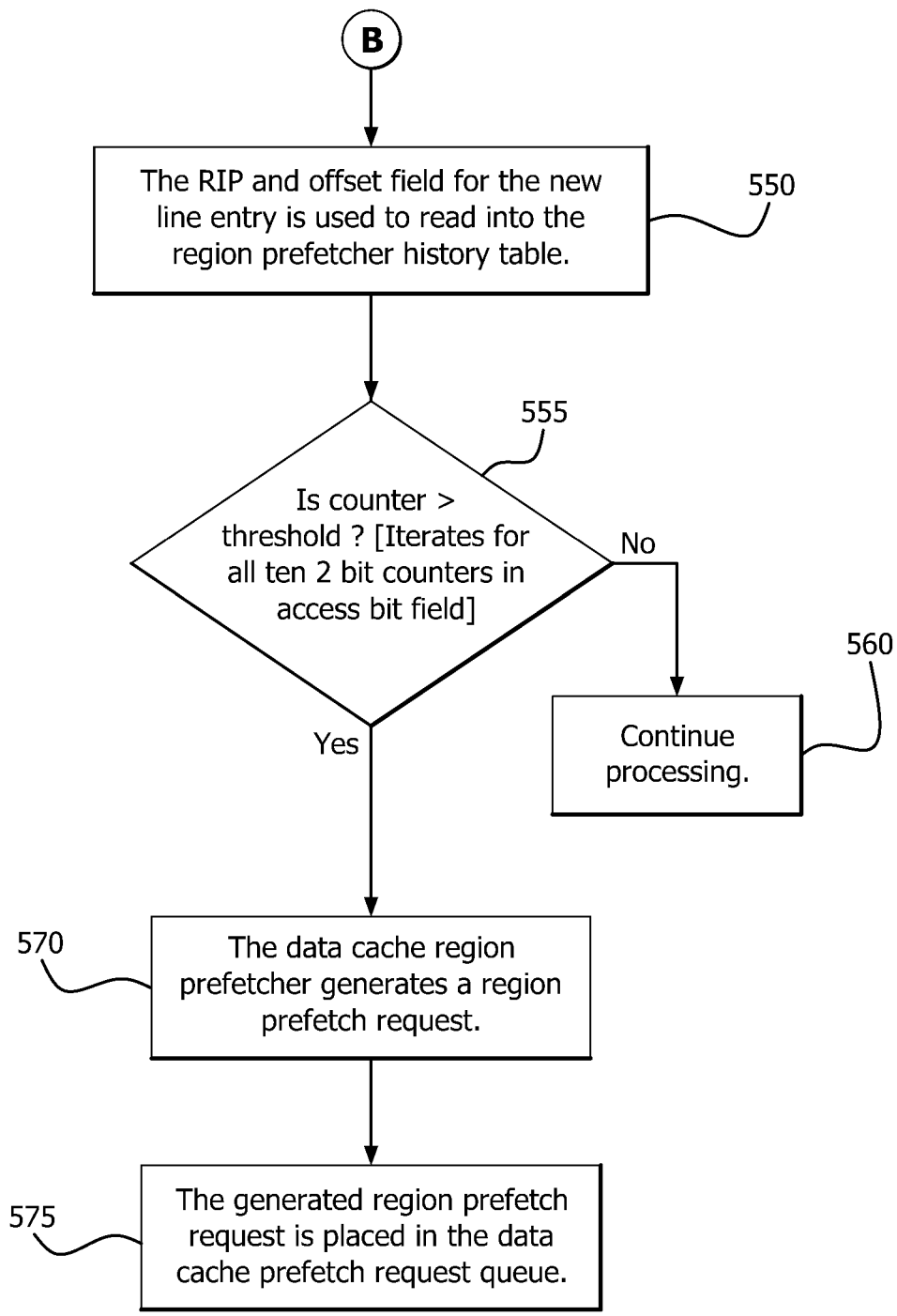

FIGS. 5A1 and 5A2 are an example flow diagram 500 of a method for use with a data cache region prefetcher in accordance with certain implementations. The data cache region prefetcher receives a memory request upon a data cache miss (step 505). The memory request is compared against all line entries in the line entry table (step 510). If there is a match, the appropriate bits in the line entry table are set (step 512). If there is no match, a new region is created and entered into a line entry in the line entry table (step 515). Two different process branches occur at this point: 1) updating the region history table as described in FIGS. 5A1 and 5A2, and 2) region prefetch request generation as described in FIG. 5B (denoted as "B" in FIG. 5A1). Referring still to FIGS. 5A1 and 5A2, a home bit is set to the address of the memory request and the RIP is stored in the line entry (step 517). Subsequent memory requests are reviewed to determine if they are within a predetermined range of the memory request (step 519). If subsequent memory requests are within the predetermined range, then specific line access bits are set in the line entry for the specific region (step 521). If subsequent memory requests are not within the predetermined range, then a new region is created (step 522).

At a given time, each line entry will age out as new line entries are being created (step 523). At this time, the line access bits are reviewed to determine what pattern exists (step 525). If the detected pattern is contiguous and sequential (e.g., there is an ascending or descending pattern relative to the home bit), then the line entry is discarded (step 527). In an implementation, the data cache region prefetcher discards those line entries when ((second line access bits [+1] AND line access bits [+6:+1] (which are all set to 1)) equals 1) OR ((second line access bits [−1] AND line access bits [−1:−4] (which are all set to 1)) equals 1). If the detected pattern is pseudo-random (step 529) (e.g., bits 6, 2 and 3 are set), the line entry is prepared for moving to the region history table using the RIP and address offset of the memory request as an index (step 531). That is, the RIP and address offset of the line entry are used as an index to read an entry out of the region history table. If the corresponding access bit in the line entry is set to 1, then the data cache region prefetcher increments the specific counters (step 537). If the corresponding access bit in the line entry is set to 0, then the data cache region prefetcher decrements the specific counters. If the detected pattern is not pseudo-random, the line entry is handled by other prefetchers or modules for other processing (step 532).

Referring now to FIG. 5B, the RIP and the offset (shown as an octo-word offset with address bits 5 and 4 in FIG. 4) for the new entry are used to read into the region history table (step 550). The data cache region prefetcher then examines each 2 bit counter in the access field of the region history table entry (step 555). If a counter is above a threshold, the data cache region prefetcher generates a region prefetch request (step 570). The generated region prefetch request is placed in the data cache prefetch request queue (step 575). If the counter is not above the threshold, continue processing (step 560). That is, a region prefetch request is not generated at this time.

Figure 6:
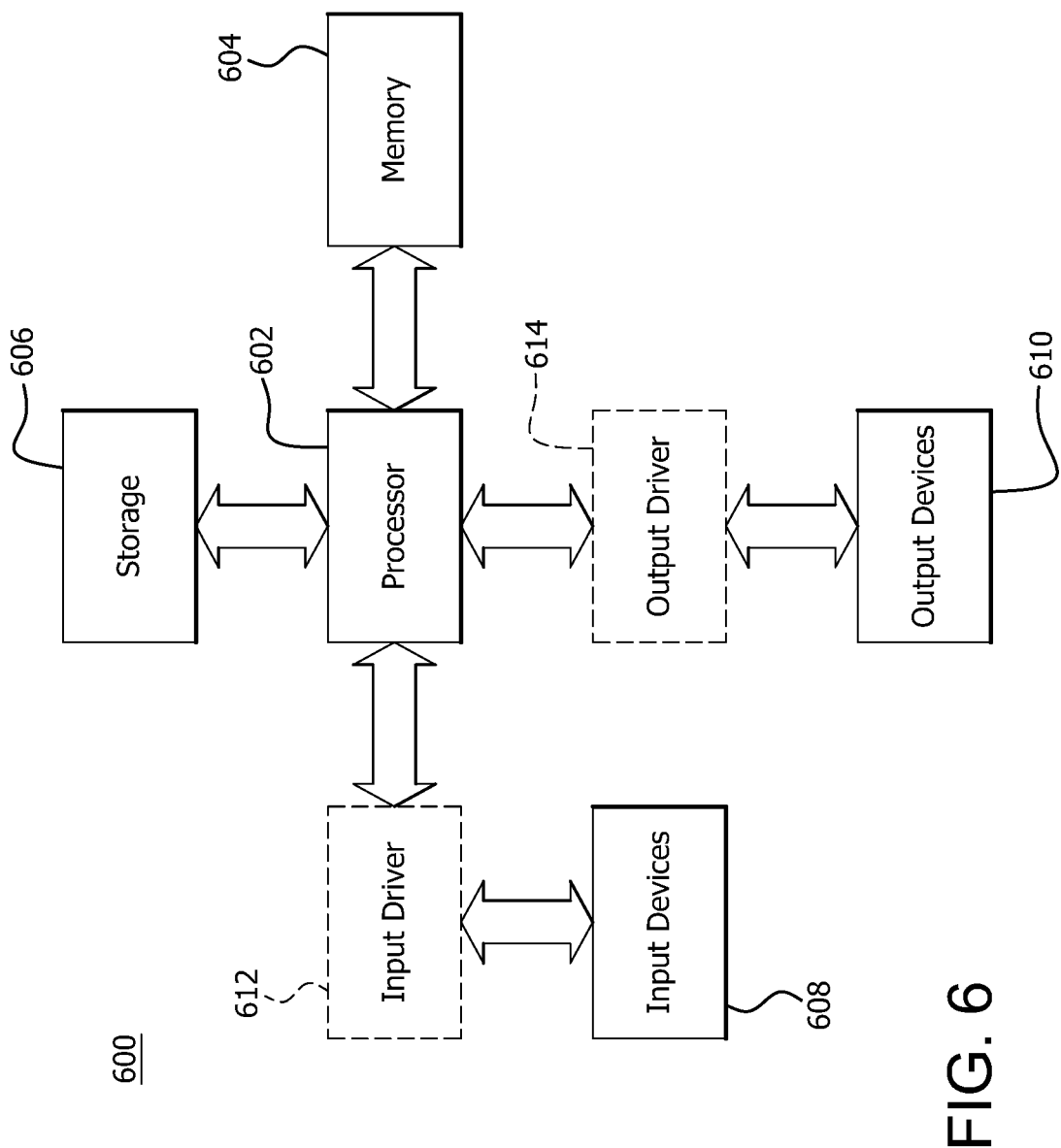
FIG. 6 is a block diagram of an example device in which one or more disclosed implementations may be implemented.

FIG. 6 is a block diagram of an example device 600 in which one or more portions of one or more disclosed embodiments may be implemented. The device 600 may include, for example, a head mounted device, a server, a computer, a gaming device, a handheld device, a set-top box, a television, a mobile phone, or a tablet computer. The device 600 includes a processor 602, a memory 604, a storage 606, one or more input devices 608, and one or more output devices 610. The device 600 may also optionally include an input driver 612 and an output driver 614. It is understood that the device 600 may include additional components not shown in FIG. 6.

The processor 602 may include a central processing unit (CPU), a graphics processing unit (GPU), a CPU and GPU located on the same die, or one or more processor cores, wherein each processor core may be a CPU or a GPU. The memory 604 may be located on the same die as the processor 602, or may be located separately from the processor 602. The memory 604 may include a volatile or non-volatile memory, for example, random access memory (RAM), dynamic RAM, or a cache.

The storage 606 may include a fixed or removable storage, for example, a hard disk drive, a solid state drive, an optical disk, or a flash drive. The input devices 608 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 610 may include a display, a speaker, a printer, a haptic feedback device, one or more lights, an antenna, or a network connection (e.g., a wireless local area network card for transmission and/or reception of wireless IEEE 802 signals).

The input driver 612 communicates with the processor 602 and the input devices 608, and permits the processor 602 to receive input from the input devices 608. The output driver 614 communicates with the processor 602 and the output devices 610, and permits the processor 602 to send output to the output devices 610. It is noted that the input driver 612 and the output driver 614 are optional components, and that the device 600 will operate in the same manner if the input driver 612 and the output driver 614 are not present.

In general, in an implementation, a data cache region prefetcher includes a line entry data table having a plurality of line entries, where each line entry includes a region defined by a predetermined number of access bits and where an access bit for a given line entry is set if a cache line is requested within the region. The data cache region prefetcher further includes a region history table configured to receive evictions from the line entry data table. The data cache region prefetcher determines if an access pattern from certain access bits in an evictable line entry and excludes line entries having predetermined access patterns from eviction to the region history table. In an implementation, the data cache region prefetcher evicts the line entries having pseudo-random access patterns to the region history table. In an implementation, the region history table is indexed using at least an instruction pointer register (RIP). In an implementation, the region history table is further indexed using an offset to support multiple pseudo-random access patterns, for the same RIP, depending on whether an initial access to a region is at a beginning, end or middle of a cache line. In an implementation, each region history entry includes the predetermined number of access bits, each region history entry includes counters for certain access bits in the predetermined number of access bits, and the counters are incremented or decremented depending on whether the access bit is set for the evictable line entry. In an implementation, the data cache region prefetcher further includes a region prefetch generator configured to receive prefetch requests from the region history table on a condition that counters associated with specific access bits in a specific region history entry in the region history table have reached a threshold. In an implementation, the data cache region prefetcher blocks other prefetchers from processing streams that are pending with the data cache region prefetcher. In an implementation, each line entry further includes second access bits which are set when a subsequent cache line request is within one access bit of a home bit in the predetermined number of access bits and which are used to determine the predetermined access patterns that are excluded from eviction to the region history table.

In an implementation, a processing system includes a stream prefetcher and a data cache region prefetcher. The data cache region prefetcher including a line entry data table having a plurality of line entries and a region history table which receives evictions from the line entry data table. Each line entry includes a region defined by a predetermined number of access bits, and an access bit for a given line entry is set if a cache line is requested within the region. The data cache region prefetcher determines an access pattern from certain access bits in an evictable line entry, excludes line entries having predetermined access patterns from eviction to the region history table and blocks the stream prefetcher from processing streams that are pending with the data cache region prefetcher. In an implementation, the data cache region prefetcher evicts line entries having pseudo-random access patterns to the region history table. In an implementation, the region history table is indexed using at least an instruction pointer register (RIP). In an implementation, the region history table is further indexed using an offset to support multiple pseudo-random access patterns, for the same RIP, depending on whether an initial access to a region is at a beginning, end or middle of a cache line. In an implementation, each region history entry includes the predetermined number of access bits, each history line entry includes counters for certain access bits in the predetermined number of access bits, and the counters are incremented or decremented depending on whether there is a bit set in the respective access bit. In an implementation, the system includes a region prefetch generator configured to receive prefetch requests from the region history table on a condition that counters associated with specific access bits in a specific region history entry in the region history table have reached a threshold. In an implementation, each line entry further includes second access bits which are set when a subsequent cache line request is within one access bit of a home bit in the predetermined number of access bits and which are used to determine the predetermined access patterns that are excluded from eviction to the region history table.

In an implementation, a method for data cache region prefetching includes a cache line request being received at a line entry table, the line entry table having a plurality of line entries, where each line entry includes a region defined by a predetermined number of access bits. An access bit is set for a given line entry if the cache line request is within the region. An access pattern is determined from certain access bits in an evictable line entry. Line entries having predetermined access patterns are excluded from eviction to a region history table and line entries having pseudo-random access patterns are evicted to a region history table. In an implementation, the region history table is indexed using at least an instruction pointer register (RIP). In an implementation, the region history table is indexed using the RIP and an offset to support multiple pseudo-random access patterns, for the same RIP, depending on whether an initial access to a region is at a beginning, end or middle of a cache line. In an implementation, each history line entry includes counters for certain access bits in the predetermined number of access bits and the counters are incremented or decremented depending on whether respective access bits are set. In an implementation, prefetch requests are sent to a region prefetch generator on a condition that counters associated with specific access bits in a specific history line entry meet or exceed a threshold. In an implementation, other prefetchers are blocked from processing streams that are pending with the data cache region prefetcher. In an implementation, each line entry further includes second access bits and the second access bits are set when a subsequent cache line request is within one access bit of a home bit in the predetermined number of access bits and the set second access bits are used to determine the predetermined access patterns that are excluded from eviction to the region history table.

In general and without limiting embodiments described herein, a computer readable non-transitory medium including instructions which when executed in a processing system cause the processing system to execute a method for data cache region prefetching.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the implementations.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system, comprising:
    data cache region prefetcher circuitry configured to:
    detect a first access by a first instruction at a first instruction address to a first memory portion;
    store a first line entry in a line entry table in response to detecting the first access by the first instruction;
    update line access bits in the first line entry based on a set of memory accesses to a set of addresses in the first memory portion;

in response to the first line entry aging out of the line entry table, detect that the line access bits indicate a first non-sequential access pattern, in response to detecting that the line access bits indicate the first non-sequential access pattern, evict the first line entry to a region history table; and in response to a miss by a second instruction at the first instruction address, pre-fetch data according to the first non-sequential access pattern as specified by the first line entry in the region history table.

2. The system of claim 1, wherein the first line entry includes information for identifying an address for the first access and information for identifying an instruction pointer address for the first instruction.

3. The system of claim 1, wherein the first line entry corresponds to the first memory portion.

4. The system of claim 1, wherein the first non-sequential access pattern includes a plurality of misses.

5. The system of claim 1, wherein the pre-fetching the data according to the first non-sequential access pattern occurs in response to the first line entry being in the region history table.

6. The system of claim 1, wherein the first instruction and the second instruction are the same.

7. A method comprising:
detecting, by a data cache region prefetcher, a first access by a first instruction at a first instruction address to a first memory portion;

storing, by the data cache region prefetcher, a first line entry in a line entry table in response to detecting the first access by the first instruction;

updating line access bits in the first line entry based on a set of memory accesses to a set of addresses in the first memory portion;

wherein the first line entry ages out of the line entry table and, in response, detecting that the line access bits indicate a first non-sequential access pattern, wherein the line access bits indicate the first non-sequential access pattern, and in response, evicting the first line entry to a region history table; and wherein a miss occurs by a second instruction at the first instruction address and, in response, pre-fetching, by the data cache region prefetcher, data according to the first non-sequential access pattern as specified by the first line entry in the region history table.

8. The method of claim 7, wherein the first line entry includes information for identifying an address for the first access and information for identifying an instruction pointer address for the first instruction.

9. The method of claim 7, wherein the first line entry corresponds to the first memory portion.

10. The method of claim 7, wherein the first non-sequential access pattern includes a plurality of misses.

11. The method of claim 7, wherein the pre-fetching the data according to the first non-sequential access pattern occurs in response to the first line entry being in the region history table.

12. The method of claim 7, wherein the first instruction and the second instruction are the same.

13. A non-transitory computer-readable storage medium storing instructions, the instructions when executed by a data cache region prefetcher cause the data cache region prefetcher to execute a method comprising:

detecting a first access by a first instruction at a first instruction address to a first memory portion;

storing a first line entry in a line entry table in response to detecting the first access by the first instruction;

updating line access bits in the first line entry based on a set of memory accesses to a set of addresses in the first memory portion;

in response to the first line entry aging out of the line entry table, detecting that the line access bits indicate a first non-sequential access pattern, in response to detecting that the line access bits indicate the first non-sequential access pattern, evicting the first line entry to a region history table; and in response to a miss by a second instruction at the first instruction address, pre-fetching data according to the first non-sequential access pattern as specified by the first line entry in the region history table.

14. The non-transitory computer-readable storage medium of claim 13, wherein the first line entry includes information for identifying an address for the first access and information for identifying an instruction pointer address for the first instruction.

15. The non-transitory computer-readable medium of claim 13, wherein the first line entry corresponds to the first memory portion.

16. The non-transitory computer-readable medium of claim 13, wherein the first non-sequential access pattern includes a plurality of misses.

17. The non-transitory computer-readable medium of claim 13, wherein the pre-fetching the data according to the first non-sequential access pattern occurs in response to the first line entry being in the region history table.

18. The non-transitory computer-readable medium of claim 13, wherein the first instruction and the second instruction are the same.

* * * * *